(12) United States Patent
Wang et al.

(10) Patent No.: US 12,166,267 B2
(45) Date of Patent: Dec. 10, 2024

(54) ELECTRONIC DEVICE

(71) Applicant: Lenovo (Beijing) Co., Ltd., Beijing (CN)

(72) Inventors: Wei Wang, Beijing (CN); Jian Ren, Beijing (CN); Zhiyuan Duan, Beijing (CN); Shuangjie Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 1010 days.

(21) Appl. No.: 16/581,123

(22) Filed: Sep. 24, 2019

(65) Prior Publication Data

US 2020/0106164 A1    Apr. 2, 2020

(30) Foreign Application Priority Data

Sep. 30, 2018   (CN) .......................... 201811162946.2

(51) Int. Cl.
*H01Q 1/24*   (2006.01)
*H04M 1/02*   (2006.01)

(52) U.S. Cl.
CPC ............ *H01Q 1/243* (2013.01); *H04M 1/026* (2013.01)

(58) Field of Classification Search
CPC ............................... H01Q 1/243; H04M 1/026
See application file for complete search history.

(56) References Cited

U.S. PATENT DOCUMENTS

| | | | |
|---|---|---|---|
| 2014/0111381 A1 | 4/2014 | Lin | |
| 2018/0026361 A1* | 1/2018 | Sakong | H01Q 5/35 |
| | | | 343/860 |
| 2018/0358699 A1* | 12/2018 | Li | H01Q 1/521 |
| 2020/0058992 A1* | 2/2020 | Wu | H01Q 1/48 |
| 2021/0126349 A1* | 4/2021 | Zhou | H01Q 1/36 |

FOREIGN PATENT DOCUMENTS

| | | | | |
|---|---|---|---|---|
| CN | 104852122 A | | 8/2015 | |
| CN | 105098381 A | | 11/2015 | |
| CN | 106486772 A | | 3/2017 | |
| CN | 107566577 A | * | 1/2018 | |
| CN | 108199145 A | | 6/2018 | |
| CN | 108258425 A | * | 7/2018 | ........... H01Q 1/2258 |
| CN | 108288747 A | | 7/2018 | |
| CN | 108511906 A | | 9/2018 | |

OTHER PUBLICATIONS

Dongho Lee, "A simple monopole antenna for hepta-band LTE/WWAN metal-framed mobile phone," 2015 International Symposium on Antennas and Propagation (ISAP), Hobart, TAS, Australia, 2015, pp. 1-3 (Year: 2015).*

* cited by examiner

*Primary Examiner* — Dieu Hien T Duong

(74) *Attorney, Agent, or Firm* — ANOVA LAW GROUP, PLLC

(57) ABSTRACT

An electronic device is provided. The device includes a metal frame. The metal frame includes a first side and the first side includes three metal segments separated by two first gaps. The three metal segments include a first metal segment and the first metal segment is used to realize a first antenna. An operating frequency band of the first antenna at least includes 5 GHz to enable the electronic device to support a fifth-generation mobile communication network.

8 Claims, 3 Drawing Sheets

ELECTRONIC DEVICE

CROSS-REFERENCES TO RELATED APPLICATION

This application claims the priority of Chinese Patent Application No. 201811162946.2, filed on Sep. 30, 2018, the content of which is incorporated herein by reference in its entirety.

TECHNICAL FIELD

The present disclosure generally relates to the field of communication technologies and, more particularly, relates to an antenna structure and an electronic device.

BACKGROUND

In order to enable electronic devices supporting a fifth-generation mobile communication technology (5G) to receive and transmit signals, antennas supporting a 5G frequency band needs to be disposed on the electronic devices. The antennas usually are formed by a laser-direct-structuring (LDS) process in the electronic devices supporting the 5G frequency band because of limited spaces in the electronic devices.

The antennas formed by the LDS process are metal antennas plated on structured plastic supports by a laser radiation plating process. Correspondingly, the antennas are formed by lasing on backplates or outer shells of the electronic devices. Although forming the antennas on the outer shells of the electronic devices by the LDS process may facilitate efficient utilization of inner spaces of the electronic devices, antenna base materials suitable for the LDS process, such as plastic supports made of special materials, have to be disposed in the electronic devices, for forming the antennas on the outer shells of the electronic devices by the LDS process. The electronic devices with metal backplates or the electronic devices without the antenna base materials for the LDS process do not meet requirements for forming the antennas by the LDS process.

Thus, there is a need to provide an electronic device having antennas with a wider application and supporting the frequency band corresponding to the 5G network.

SUMMARY

One aspect of the present disclosure provides an electronic device. The electronic device includes a metal frame. The metal frame includes a first side and the first side includes three metal segments separated by two first gaps. The three metal segments include a first metal segment and the first metal segment is used to realize a first antenna. An operating frequency band of the first antenna at least includes 5 GHz to enable the electronic device to support a fifth-generation mobile communication network.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
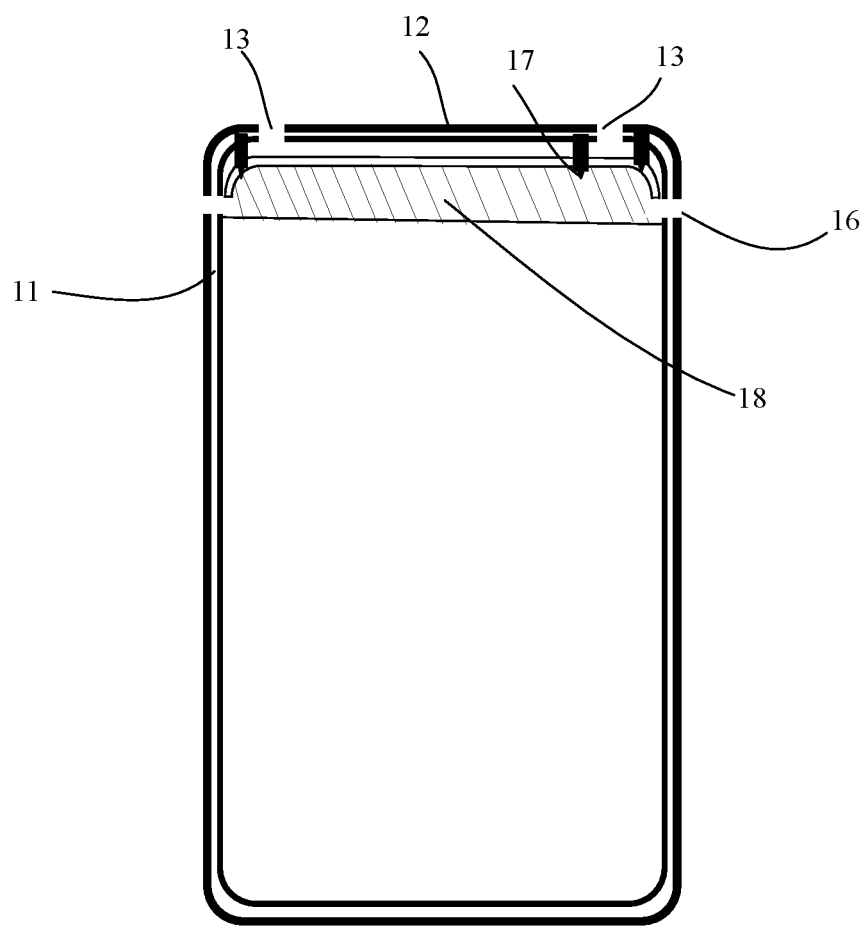
FIG. 1 illustrates an electronic device according to various disclosed embodiments of the present disclosure.

Various embodiments of the present disclosure provide an electronic device. The electronic device may be a portable terminal (such as a cell phone and a tablet) or another electronic device supporting wireless communication networks.

The present disclosure provides an electronic device. The electronic device may include a metal frame. The metal frame may include a first side and the first side may be divided into three metal segments by two first gaps. The three metal segments may be separated from each other by the two gaps and may be used as antennas of the electronic device.

The three metal segments in the first side of the metal frame may include a first metal segment, and the first metal segment may be used to realize a first antenna. An operating frequency band of the first antenna may at least include 5 GHz to enable the electronic device to support the 5G communication network.

The metal frame may be made of four sides and may include two first frames parallel to each other and two second frames parallel to each other. The first frames may be perpendicular to the second frames. The first side of the metal frame may be any one of the four frames of the metal frame.

To enable the first antenna to be compatible with the second-generation mobile communication (2G), the third-generation mobile communication (3G), the fourth-generation mobile communication (4G), wireless fidelity WiFi, and other networks, the first side of the metal frame may be a side of the metal frame at a top of the electronic device or at a bottom of the metal frame, since antennas support the 2G, the 3G, the 4G, and other networks usually are disposed at a side of the metal frame at a top of the electronic device or at a bottom of the metal frame.

The top and the bottom of the electronic device may be specified by an image display mode preset in the electronic device (a default image display mode). For example, if the image display mode preset in the electronic device is vertical, the top of the electronic device may be an upper end of the electronic device in the vertical screen state based on the vertical screen.

The metal frame of the electronic device includes two first frames parallel to each other and two second frames parallel to each other. The first frames may have a length smaller than a length of the second frames. The electronic device usually is used in the vertical screen state and the first frame is at the top of the electronic device. Correspondingly, the side of the metal frame at the top of the electronic device may be one of the first frames of the metal frame at the top of the electronic devices, and the side of the metal frame at the bottom of the electronic device may be another of the first frames of the metal frame at the bottom of the electronic device.

The operating frequency band of the first antenna may at least include 5 GHz. The operating frequency band of the 5G networks supported by the first antenna may also be configured according to actual needs, so the operating frequency band of the first antenna may support other frequency bands of the 5G networks besides 5 GHz.

Besides the 5G network, the first antenna may support one or more of the second-generation mobile communication (2G), the third-generation mobile communication (3G), the fourth-generation mobile communication (4G), wireless fidelity WiFi, Global Positioning System (GPS), and other networks, to enable the electronic device to support the fifth-generation mobile communication network.

In the present disclosure, the electronic device may include the metal frame, and the first side of the metal frame may be divided into the three metal segments by the two first gaps. The three metal segments of the metal frame may include the first metal segment and the first metal segment may be used to realize the first antenna. The operating frequency band of the first antenna may at least include 5 GHz and then the first antenna may enable the electronic device to support the 5G network. An antenna base material for the LDS process may be unnecessary for the electronic device to support the 5G network, and the antennas for supporting the 5G network may be disposed in the electronic device more flexibly.

Reference will now be made in detail to various embodiments of the disclosure, which are illustrated in the accompanying drawings. Wherever possible, the same reference numbers will be used throughout the drawings to refer to the same or like parts.

FIG. 1 illustrates an electronic device where antennas are disposed at a metal frame of the electronic device, according to various disclosed embodiments of the present disclosure.

As illustrated in FIG. 1, the electronic device may include a metal frame 11. The metal frame 11 may include a first side 12 and the first side 12 may be divided into three metal segments by two first gaps 13.

Gaps in the first side 12 of the metal frame 11 may be the first gaps 13. Positions and distribution of the two first gaps 13 in the first side 12 may be configured in any suitable form.

In one embodiment, the two first gaps in the first side 12 of the metal frame 11 may be symmetrically disposed with respect to a middle vertical line of the first side 12 of the metal frame 11. A distance between each of the two first gaps and the middle vertical line of the first side 12 may be configured according to actual needs. In one embodiment, the three metal segments of the first side 12 may have the same length by appropriately configure the distance of the two first gaps. In some other embodiments, a distance between each of the two first gaps and a corresponding end of two ends of the first side may be smaller than the distance between each of the two first gaps and the middle vertical line of the first side. Correspondingly, a length of two of the three metal segments close to two ends of the first side may be smaller than a length of a metal segment at the middle position among the three metal segments, as illustrated in FIG. 1.

Anyone of the three metal frames may be used as the first metal frame to realize the first antenna. In some embodiment, the first antenna may be the metal segment at the middle position among the three metal segments.

The operating frequency band of the first antenna may at least include 5 GHz in the frequency band of the 5G network, to enable the electronic device to support the 5G network.

The frequency band of the 5G network may include a frequency band below 6 GHz (a sub-6 GHz frequency band) and a millimeter frequency band. In one embodiment, the operating frequency band of the first antenna may be a portion of or all of the sub-6 GHz frequency band including 5 GHz.

To enable the first antenna to receive and transmit signals corresponding to the frequency band of the 5G network, the first antenna may be connected to an antenna feeding network in the electronic device supporting the 5G network. The first antenna may be connected to a feeding point corresponding to the first antenna in the antenna feeding network through a spring. In one embodiment illustrated in FIG. 1, when each of the three metal segments is used as an antenna, each of the three metal segments may be connected to a corresponding feeding point 17 and a printed circuit board 18 through a corresponding spring. A corresponding antenna feeding network corresponding to each antenna may be disposed in the printed circuit board 18.

Since the first metal segment of the first antenna in the metal frame may be separated from other metal frames of the first side of the metal frame by gaps, the first antenna may convert high-frequency oscillating currents generated by the antenna feeding network into electromagnetic waves in the 5G frequency band and then radiate the electromagnetic wave outwards by the gaps in the first side. Also, the first antenna may convert electromagnetic waves outside into high-frequency oscillating currents and then transmit the high-frequency oscillating currents to a receiver in the electronic device by the gaps in the first side, to enable the electronic device to receive signals in the 5G frequency band.

In some embodiments, to improve compatibility of the first antenna and to enable the electronic device to support multiple mobile communication networks, WiFi, and/or GPS, with a minimum number of antennas, the operating frequency band of the first antenna may be configured to enable the electronic device to at least support two generations mobile communication networks. The two generations of mobile communication networks may include the 5G network and other communication networks besides the 5G networks. The first antenna may further support other networks including WiFi and/or GPS.

In one embodiment, the operating frequency band of the first antenna may be 0.6 GHz to 5 GHz, to enable the first antenna to support at least two generations of mobile communication networks including the 5G network.

Since the first side of the metal frame may be divided to three metal segments by the two gaps, the three metal segments may be used to realize three antennas, and the three antennas realized through the three metal segments may include the above first antenna.

The communication networks supported by the three antennas may be same or different. In one embodiment, types and quantity of the communication networks supported by each of the three antennas may be different. In some embodiments, an operating frequency band of each of three antennas in the first side may be configured to enable the electronic device to at least support two communication networks, and the two communication networks supported by at least two antennas of the three antennas in the first side may include the 5G network. The two communication networks may not be limited to 2G, 3G, 4G, and 5G mobile communication networks, and may be WiFi, GPS, and other communication networks.

Two antennas of the three antennas besides the first antenna may be a second antenna and a third antenna. In one embodiment, the first antenna and the second antenna may support at least two communication networks including the 5G network. The third antenna may support two communication networks including the 5G network, or support two communication networks without the 5G network. For example, the first antenna may support 5G, 4G, 3G, and 2G networks, and may have an operating frequency band of about 0.6 GHz to about 3 GHz. The second antenna may support signals corresponding to the frequency band of the 5G network, and support L2 carrier signals and L5 carrier signals of the GPS network. An operating frequency band of the second antenna may be 1.17 GHz-1.2 GHz, and 3.3 GHz-5 GHz. The third antenna may support L1 carrier signals of the GPS network, the WiFi network operating in a 2.4 GHz frequency band, and the WiFi network operating in a 5 GHz frequency band. An operating frequency band of the third antenna may be 1.575 GHz±30 MHz, 2.4 GHz-2.48 GHz, and 5.15 GHz-5.85 GHz.

A position order of the first antenna, the second antenna, and the third antenna in the first metal segment may be configured as needed, and the present disclosure has no limits on this.

In one embodiment, if the first antenna support 5G, 4G, 3G, and 2G networks, the first antenna may be a metal segment at the middle position of the three metal segments of the first side of the metal frame, to enable the electronic device to stably support these mobile communication networks. As illustrated in FIG. 1, in the three metal segments of the first side 12, a metal segment at the middle position may be the first antenna, and the other two metal segments at sides of the first antenna may be the second antenna and the third antenna respectively.

In one embodiment, the first side of the metal frame may be separated from other portions of the metal frame other than the first side by gaps. As illustrated in FIG. 1, each of the two metal segments at the two ends of the first side may be separated from other portions of the metal frame beneath the first side by gaps 16.

A width of the first gaps and a width of the gaps between the first side and the other portions of the metal frame other than the first side may be configured as needed. To enable reliable receive and transmission of signals, the width of the first gaps and the width of the gaps between the first side and the other portions of the metal frame other than the first side may be larger than or equal to 1.5 mm.

In some embodiments, the first gaps and other gaps in the metal frame of the electronic device may be filled with non-metallic dielectric materials.

The first antenna may be any suitable type antenna and can be configured as needed.

In one embodiment, the first antenna may be a monopole antenna. When the first antenna is a monopole antenna, the first antenna may be not grounded, and a feeding point of the first antenna may be connected to the corresponding antenna feeding network.

In one embodiment where the first antenna is the metal segment in the middle position of the first side 12, the first antenna may be configured as a monopole antenna since the first antenna is separated from other antennas.

The second antenna and the third antenna may be monopole antennas or loop antennas. When the second antenna and the third antenna are monopole antennas, the second antenna and the third antenna may be not grounded, and corresponding feeding points connected to corresponding antenna feeding networks may be disposed in the second antenna and the third antenna. When the second antenna and the third antennas are loop antennas, the second antenna and the third antenna may be not grounded.

In one embodiment, when the first antenna supports frequency bands corresponding to 2G, 3G, 4G, and 5G networks and the operating frequency band of the first antenna is 0.6 GHz-3 GHz, the antenna feeding network connected to the feeding point of the first antenna may be a variable-capacitor-switch-combination circuit, which may also be referred to as a variable-capacitor-switch oscillator, to realize a multiplex coverage of the first antenna in all frequency bands.

Figure 2:
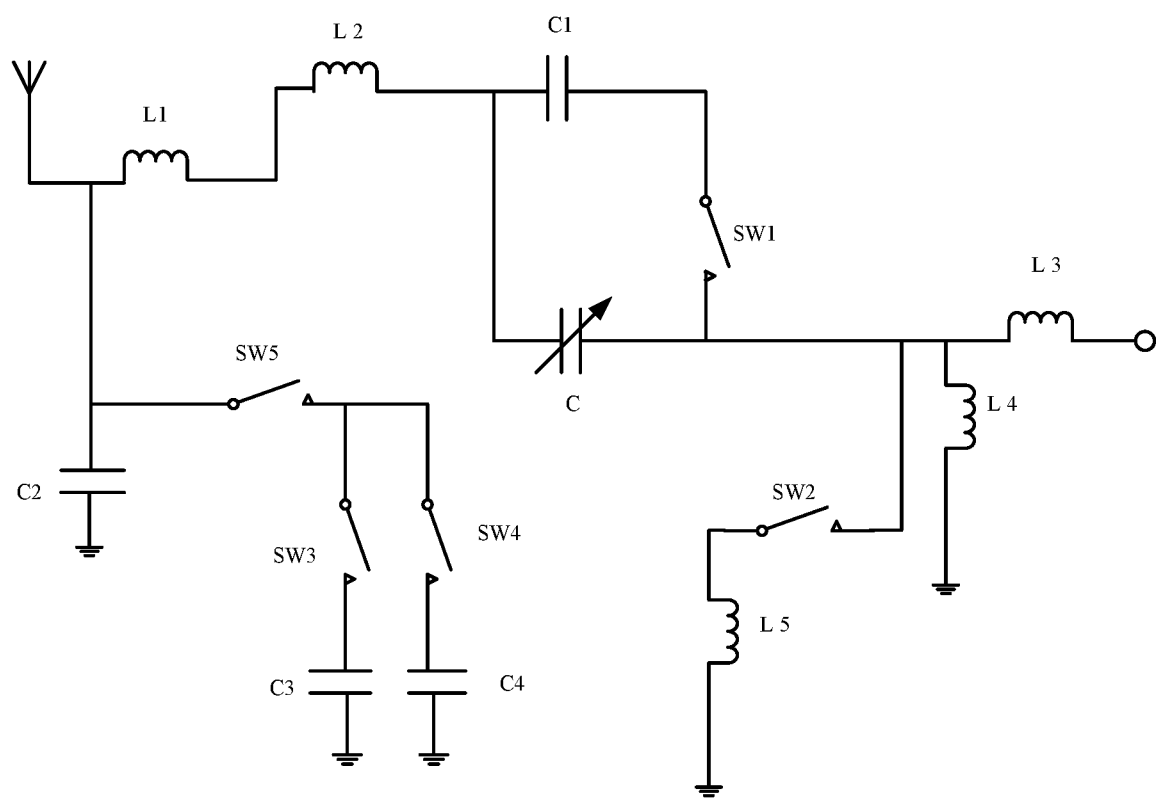
FIG. 2 illustrates an antenna feeding network connected to a first antenna of an electronic device, according to various disclosed embodiments of the present disclosure.

The variable-capacitor-switch-combination circuit may include a variable capacitor and five switches. Status of the first antenna in different frequency bands may be satisfied through tunning a capacitance value of the variable capacitor and different combinations of the status of the five switches. FIG. 2 illustrates a circuit for an antenna feeding network connected to a first antenna of an electronic device, according to various disclosed embodiments of the present disclosure.

The antenna feeding network in FIG. 2 may be applied to the first antenna supporting the 2G and 5G networks and may be disposed in the printed circuit board in FIG. 1. The antenna feeding network in FIG. 2 may be connected to the first antenna through a feeding point.

In FIG. 2, the antenna feeding network may include a variable capacitor C and five switches. The five switches may be a switch SW1, a switch SW2, a switch SW3, a switch SW4, and a switch SW5. The antenna feeding network may further include some inductors, such as an inductor L1, an inductor L2, an inductor L3, an inductor L4, and an inductor L5. The antenna feeding network may also include some capacitors, such as a capacitor C1, a capacitor C2, a capacitor C3, and a capacitor C4. The antenna feeding network may also include some resistors which are not shown in FIG. 2.

As illustrated in FIG. 2, a main circuit branch of the antenna may include the inductor L1, the inductor L2, the variable capacitor C, and the inductor L3, which are connected in serial. The variable capacitor C may be connected in parallel with a first branch including the capacitor C1 and the switch SW1.

An end of the inductor L3 in the main circuit branch may be connected to a radio frequency circuit. Another end of the inductor L3 may be connected to the variable capacitor C in the main circuit branch, the switch SW1, and a second branch. The second branch may include the inductor L4 and the inductor L4 may be grounded.

The end of the inductor L3 connected to the second branch may also be connected to a third branch. The third branch may include the switch SW2 and the inductor L5 connected in serial. The inductor L5 may be grounded.

An end of the inductor L1 in the main circuit branch may be connected to the inductor L2 in the main circuit branch. Another end of the inductor L1 may be connected to the first antenna in the main circuit branch, a fourth branch, and a fifth branch.

The fourth branch may include the inductor C2 and the inductor C2 may be grounded.

The fifth branch may include a first sub-branch and a second sub-branch in serial with the switch SW5. The first sub-branch may include the switch SW3 and the capacitor C3 in serial, where the capacitor C3 may be grounded. The second sub-branch may include the switch SW4 and the capacitor C4 in serial, where the capacitor C4 may be grounded.

For description purposes only, the embodiment with the antenna feeding network illustrated in FIG. 2 connected to the first antenna is used as an example to illustrate the present disclosure, and should not limit the scopes of the present disclosure. In various embodiments, the antenna feeding network may have any suitable forms as long as it supports the frequency band of the communication networks that the first antenna is configured to support.

For other antennas realized by other metal segments except for the first antenna, the antenna feeding networks connected to the antennas may have any suitable forms.

In one embodiment, to enable the electronic device to support the 5G network reliably, four antennas supporting the frequency band of the 5G network may be disposed in the electronic device, and the first antenna may be one of the four antennas supporting the frequency band of the 5G network in the electronic device.

In one embodiment, other three antennas other than the first antenna supporting the frequency band of the 5G network may only support the 5G network. In some other embodiments, other three antennas other than the first antenna supporting the frequency band of the 5G network may support multiple communication networks including the 5G network. The present disclosure has no limit on this.

An arrangement of the other three antennas other than the first antenna supporting the frequency band of the 5G network may have any suitable setup. In one embodiment, other three antennas other than the first antenna supporting the frequency band of the 5G network may be antennas formed by the LDS process. In another embodiment, among other three antennas other than the first antenna supporting the frequency band of the 5G network, at least one of them may be an antenna realized by the metal frame. If the antennas realized by the metal frame are less than three, remaining antennas may be formed by the LDS process. For example, among the metal segments other than the first metal segments in the three metal segments in the first side of the metal frame, one or two metal segments may be used to realize the antennas at least supporting the frequency band of the 5G network, and another antenna supporting the frequency band of the 5G network may be formed by the LDS process.

In the present disclosure, the metal frame may be used to realize at least one antenna. The at least one antenna may include the first antenna realized by the first metal segment. The at least one antenna may also include other three antennas other than the first antenna in the four antennas supporting the frequency band of the 5G network.

Different ways may be used to realize the four antennas supporting the frequency band of the 5G network through the metal frame. In one embodiment, the three metal segments of the first side in the metal frame may be used as three antennas including the first antenna, and the three antennas may support the communication networks including the 5G network. A portion of or all other parts of the metal frame other than the first side may be used to realize an antenna support the 5G network, and the metal frame may be used to realize the four antennas supporting the frequency band of the 5G network.

In another embodiment, other sides other than the first side of the metal frame may be divided into metal segments by gaps. Four metal segments may be picked out from the metal segments of the first side and the metal segments of the other sides except for the first side, to be configured as the antennas supporting the frequency band of the 5G network.

For example, if the first side of the metal frame is a first frame of the metal frame, a second frame of the metal frame may be divided into a plurality of metal segments by gaps, and correspondingly, the first side and the second frame of the metal frame may be divided into a plurality of metal segments. At least four metal segments in the metal segments of the first side and the second frame of the metal frame may be used to realize the four antennas supporting the frequency band of the 5G network.

For description purposes only, the above embodiments are used as examples to illustrate the present disclosure, and should not limit the scopes of the present disclosure. Any suitable ways may be used to realize the four antennas supporting the frequency band of the 5G network through the metal frame and the present disclosure has no limit on this. For example, two gaps may be also disposed in the second side of the metal frame.

To realize the four antennas supporting the frequency band of the 5G network or to enable the electronic device to support frequency bands of more communication networks, gaps may be disposed other frames of the metal frame other than the first side to divide other frames other than the first side into a plurality of metal segments.

Figure 3:
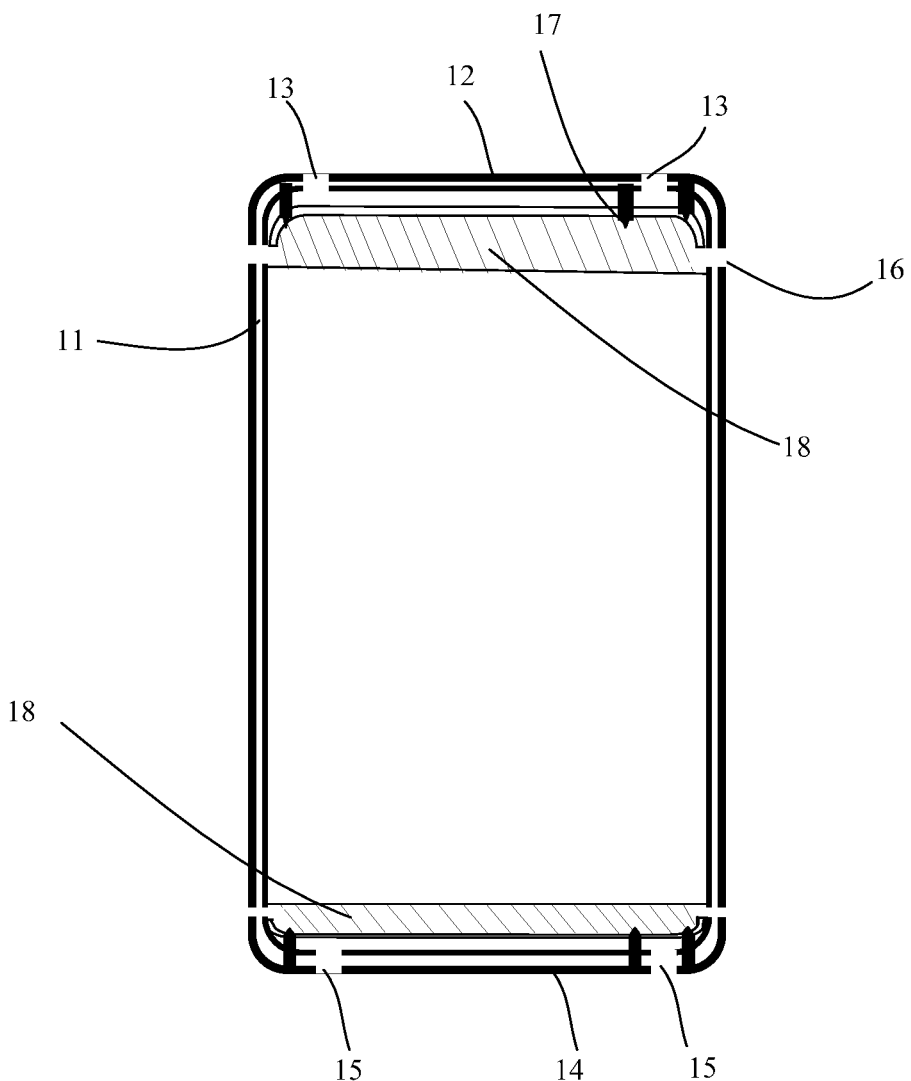
FIG. 3 illustrates another electronic device according to various disclosed embodiments of the present disclosure.

FIG. 3 illustrates another electronic device with antennas in the metal frame, consistent with various embodiments of the present disclosure.

In FIG. 3, besides the two first gaps 13 in the first side 12 of the metal frame 11 in the electronic device, two second gaps 15 may also be disposed in a second side 14 of the metal frame 11.

The second side 14 of the metal frame may be configured oppositely to the first side 12 of the metal frame 11. Correspondingly, the second side 14 and to the first side 12 of the metal frame 11 are two sides parallel to each other.

In one embodiment, the first side of the metal frame may be a side of the metal frame at the top of the electronic device, and the second side of the metal frame may be another side of the metal frame at the bottom of the electronic device.

In another embodiment, the first side of the metal frame may be a second frame of the metal frame, that is a frame of the metal frame corresponding to a side edge of the electronic device, and the second side of the metal frame may be another second frame of the metal frame other than the first side.

The second side 14 of the metal frame 11 may be divided into three metal segments by the second gapes 15, as illustrated in FIG. 3.

Positions of the second gaps 15 in the second side 14 of the metal frame may be configured in any suitable ways. In one embodiment illustrated in FIG. 3, the two second gaps 15 in the second side 14 of the metal frame 11 may be configured symmetrically with respect to the middle vertical line of the second side 14.

In one embodiment, each of the two second gaps 15 in the second side 14 of the metal frame 11 may be disposed close to a corresponding end of the second side 14.

Correspondingly, a portion of the metal frame at each end of the second side belonging to a transitional region may be configured as a metal segment by the two second gaps.

In one embodiment, the two first gaps in the first side of the metal frame may be symmetric to the second gaps in the second side of the metal frame. The two first gaps in the first side of the metal frame and the second gaps in the second side of the metal frame may be symmetric about a center of the metal frame. The two first gaps in the first side of the metal frame and the second gaps in the second side of the metal frame may be symmetric about a middle vertical line of the third sides of the metal frame, where the third sides may be the sides of the metal frame other than the first side and the second side. In one embodiment, the first side and the second side may be the first frames of the metal frame, while the third sides may be the second frames of the metal frame.

In one embodiment, similar to the antennas in the first side, the three metal segments of the second side separated by the two second gaps may include at least a fourth antenna. The fourth antenna may at least support the 5G network, to enable the electronic device to support the 5G network through the fourth antenna.

The frequency band of the 5G network may include a frequency band below 6 GHz (sub-6 GHz) and a millimeter frequency band. In one embodiment, the operating frequency band of the fourth antenna may be a portion of or all the sub-6 GHz frequency band including 5 GHz.

In some embodiments, to improve the compatibility of the fourth antenna, the operating frequency band of the fourth antenna may be configured to enable the electronic device to at least support two generations of mobile communication networks. The two generations of mobile communication networks may include the 5G network and other mobile communication networks besides the 5G networks. The fourth antenna may further support other networks including WiFi and/or GPS.

In one embodiment, the operating frequency band of the fourth antenna may be 0.6 GHz to 5 GHz, to enable the fourth antenna to support at least two generations of mobile communication networks including the 5G network.

In some embodiment, the fourth antenna may support communication networks same as the first antenna. A position of the fourth antenna relative to the second side may be same as a position of the first antenna relative to the first side. In one embodiment, the fourth antenna may be one of the three metal segments in the second side at the middle position.

A feeding point may be disposed in the fourth antenna and the feeding point may be connected to an antenna feeding network. The antenna feeding network connected to the fourth antenna may be same as the antenna feeding network connected to the first antenna, and can be referred to the above descriptions.

In one embodiment, the three metal segments in the second side may be used to realize three antennas. The three antennas in the second side may include the fourth antenna, and other two antennas of the three antennas in the second side other than the fourth antenna may be a fifth antenna and a sixth antenna respectively.

At least one of the fifth antenna and the sixth antenna may support the frequency band of the 5G network.

In some embodiments, each of the fifth antenna and the sixth antenna may support two communication networks simultaneously.

In one embodiment, the fifth antenna may support communication networks same as the communication networks supported by the second antenna, and a position of the fifth antenna relative to the second side may be same as a position of the second antenna relative to the first side.

The sixth antenna and the third antenna may support same communication networks, and may have same position relationships.

For the details of the fifth antenna and the sixth antenna, please be referred to the above descriptions about the second antenna and the third antenna.

In the present disclosure, the metal frame may be used to realize a plurality of antennas, and the plurality of antennas may at least include the first antenna supporting the frequency band of the 5G network.

In one embodiment, the metal frame may be used to realize at least five antennas. When each of the first side and the second side includes two antennas supporting two communication networks including the 5G network, an antenna only supporting the frequency band of the 5G network may be further disposed in the metal frame.

For example, the first antenna and the fourth antenna may support 5G, 4G, 3G, and 2G networks, and may have an operating frequency band of 0.6 GHz-3 GHz, the second antenna and the fifth antenna may support signals corresponding to the frequency band of the 5G network, and support L2 carrier signals and L5 carrier signals of the GPS network. An operating frequency band of the second antenna and the fifth antenna may be 1.17 GHz-1.2 GHz, and 3.3 GHz-5 GHz. The third antenna and the sixth antenna may support L1 carrier signals of the GPS network, the WiFi network operating in a 2.4 GHz frequency band, and the WiFi network operating in a 5 GHz frequency band. An operating frequency band of the third antenna and the sixth antenna may be 1.575 GHz±30 MHz, 2.4 GHz-2.48 GHz, and 5.15 GHz-5.85 GHz.

The first antenna, the second antenna, the fourth antenna, and the fifth antenna may be antennas in the metal frame supporting the 5G network and other networks simultaneously. In other embodiments, the second frames of the metal frame or at least one of the metal segments in the second frames divided by the gaps may be used to realize the antenna only support the frequency band of the 5G network. For example, a seventh antenna may be disposed in at least one second frame of the metal frame, and the seventh antenna may support the 3.3 GHz-5.0 GHz frequency band of the 5G network.

In the present disclosure, the electronic device may include the metal frame, and the first side of the metal frame may be divided into the three metal segments by the two first gaps. The three metal segments of the metal frame may include a first metal segment and the first metal segment may be used to realize the first antenna. The operating frequency band of the first antenna may at least include 5 GHz and then the first antenna may enable the electronic device supporting the 5G network. An antenna base material for the LDS process may be unnecessary for the electronic device to support the 5G network, and the antennas for supporting the 5G network may be disposed in the electronic device more flexible.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An electronic device, comprising:
a metal frame, wherein:
the metal frame includes a first side;
the first side includes three metal segments separated by two first gaps;
the three metal segments of the first side in the metal frame are used to realize three antennas;
an operating frequency band of at least two antennas of the three antennas of the first side enables the electronic device to support a fifth-generation mobile communication network, the at least two antennas of the three antennas including a first antenna;
the operating frequency band of the first antenna enables the electronic device to support at least two generations of mobile communication networks; and the first antenna is linked to an antenna feeding network;
wherein the antenna feeding network includes:
   a first branch including a first inductor, a second inductor, a variable capacitor, and a third inductor connected in serial, a first end of the third inductor being connected to a radio frequency circuit, and a second end of the third inductor being connected to the variable capacitor;
   a second branch connected in parallel with the variable capacitor and including a capacitor and a switch, the switch being connected to the second end of the third inductor; and
   a third branch connected to the second end of the third inductor and including a fourth inductor that is grounded.

2. The device according to claim 1, wherein:
the two first gaps in the first side of the metal frame are configured symmetrically about a middle vertical line of the first side of the metal frame.

3. The device according to claim 2, wherein:
the first side of the metal frame is located at a top of the electronic device or at a bottom of the electronic device; and/or
the metal frame includes a second side parallel to the first side, the second side of the metal frame includes two second gaps, and the two second gaps in the second side of the metal frame are configured symmetrically about a middle vertical line of the second side of the metal frame.

4. The device according to claim 3, wherein:
the two first gaps in the first side of the metal frame and the two second gaps in the second side of the metal frame are configured symmetrically.

5. The device according to claim 3, wherein:
the metal frame is used to realize a plurality of antennas including the three antennas realized by the first metal segment and further including two other antennas in the electronic device supporting the fifth-generation mobile communication network.

6. The device according to claim 5, wherein:
the plurality of antennas realized through the metal frame include at least five antennas.

7. The device according to claim 1, wherein:
the at least two antennas include a feeding point;
the feeding point is connected to the antenna feeding network supporting at least two communication networks;
the at least two communication networks supported by the antenna feeding network include the fifth-generation mobile communication network; and
the antenna feeding network is a variable-capacitor-switch-combination circuit.

8. The device according to claim 1, wherein:
the three metal segments include a first metal segment, a second metal segment, and a third metal segment;
the first metal segment is used to realize the first antenna wherein an operating frequency band of the first antenna is 0.6 GHz-5 GHz, to enable the electronic device to support the fifth-generation mobile communication network;
the second metal segment is used to realize a second antenna wherein an operating frequency band of the second antenna is 1.17 GHz-1.2 GHz and 3.3 GHZ-5 GHz, to support the fifth-generation mobile communication network and L2 carrier signals and L5 carrier signals of a global positioning system (GPS) network; and
the third metal segment is used to realize a third antenna wherein an operating frequency band of the third antenna is 1.575 GHz±30 MHz, 2.4 GHz-2.48 GHz, and 5.15 GHz-5.85 GHz, to support L1 carrier signals of the GPS network and a WiFi network.

* * * * *